Sept. 15, 1953  W. E. WINDSOR ET AL  2,651,941
HUMIDITY RESPONSIVE DEVICE
Filed Jan. 20, 1950  4 Sheets-Sheet 1

INVENTORS
Walter E. Windsor
Andrew J. Koll.

BY Robert F. Peck
ATTORNEY

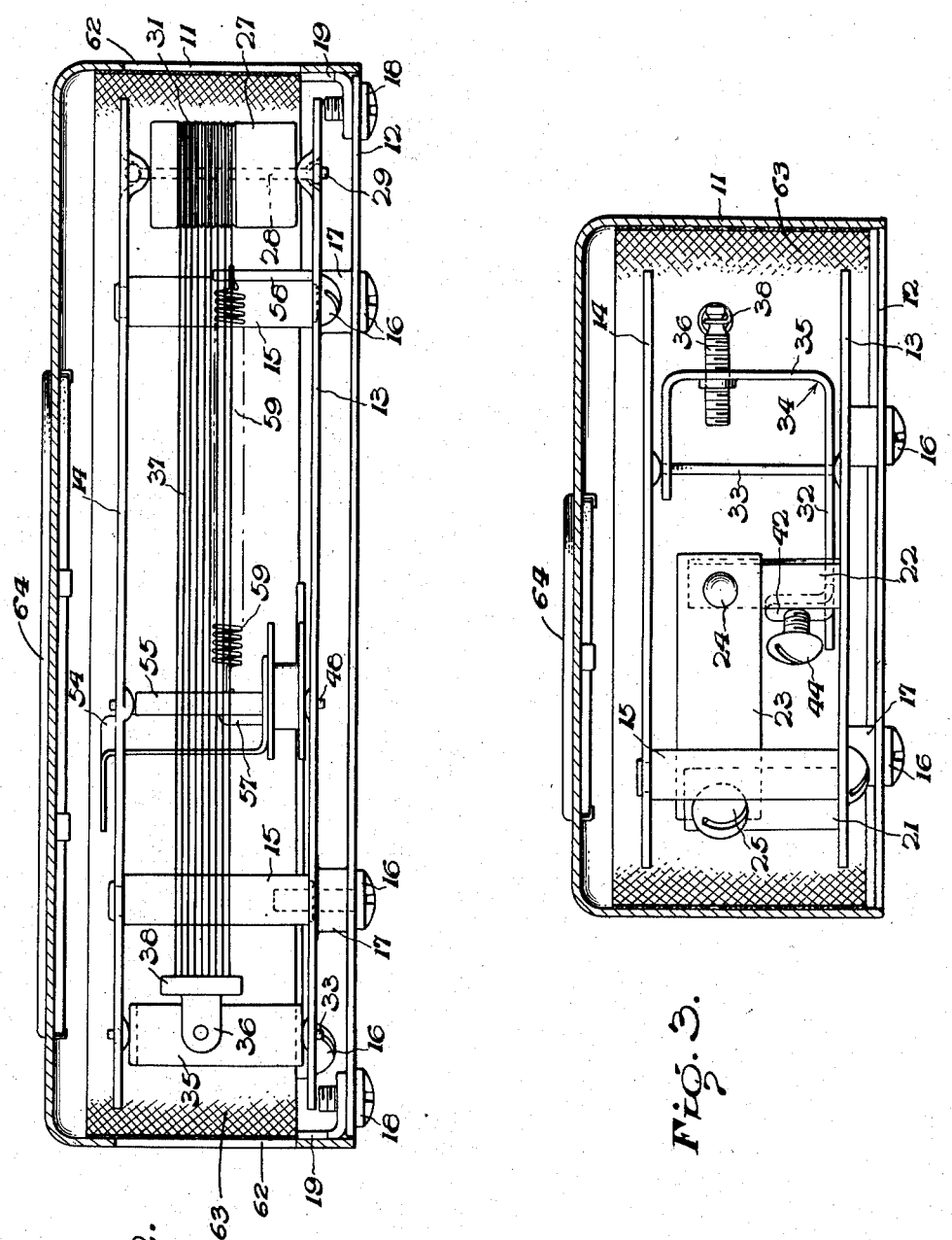

Sept. 15, 1953 W. E. WINDSOR ET AL 2,651,941
HUMIDITY RESPONSIVE DEVICE
Filed Jan. 20, 1950 4 Sheets-Sheet 3

INVENTORS
Walter E. Windsor
Andrew J. Koll.
BY Robert F. Peck
ATTORNEY

Sept. 15, 1953 W. E. WINDSOR ET AL 2,651,941
HUMIDITY RESPONSIVE DEVICE
Filed Jan. 20, 1950 4 Sheets-Sheet 4
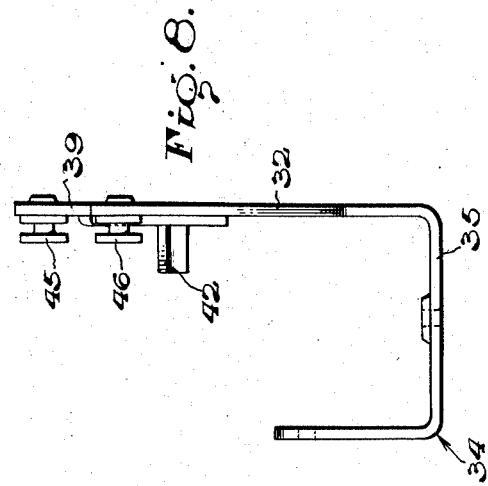
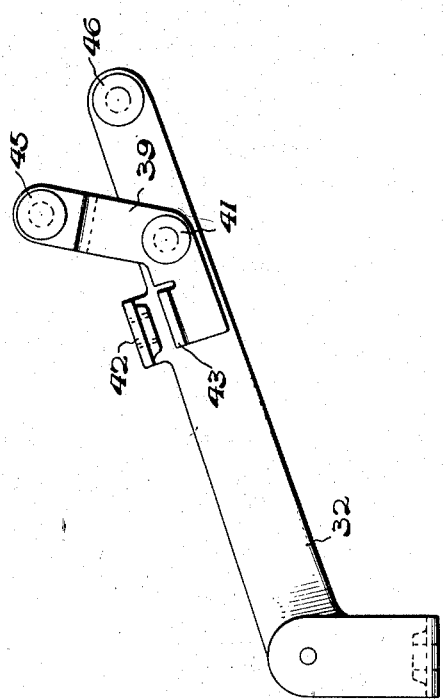
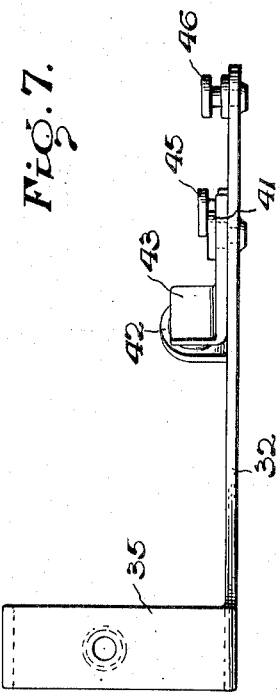
INVENTORS
Walter E. Windsor
Andrew J. Koll.
BY Robert F. Peck
ATTORNEY Patented Sept. 15, 1953

2,651,941

UNITED STATES PATENT OFFICE 2,651,941

HUMIDITY RESPONSIVE DEVICE

Walter E. Windsor, Essex, and Andrew J. Koll, Baltimore, Md., assignors to Bendix Aviation Corporation, Baltimore, Md., a corporation of Delaware Application January 20, 1950, Serial No. 139,678

4 Claims. (Cl. 73—337)

This invention relates generally to improvements in humidity responsive devices, and particularly to improvements of such a nature that achieve a compact, rugged, low-cost instrument without sacrificing precise operation.

In humidity responsive devices utilizing human hair as the hygroscopic element, it is a well-known fact that the motion developed by the expansion or contraction of the hygroscopic element is non-linear throughout the range of humidity; thus, ordinary hair elements will undergo fifty percent of their total extension when the relative humidity is approximately thirty-five percent. The other fifty percent total extension takes place in the range of thirty-five to one hundred percent relative humidity and, obviously, such a characteristic motion is non-linear. If the hair element is to be incorporated into a device that is used as an indicator, it is desirable that some means be provided to convert the non-linear motion derived from the hair element into a linear motion of the indicator arm so that same can be used with a linear scale. Of course, it would be possible to use a non-linear scale and couple the indicating arm directly to the hair element. Such an arrangement is unsatisfactory, though, for portions of the scale will be crowded, whereas portions of the scale will be expanded and an observer will experience difficulty in using and reading the instrument. It is highly desirable to have a linear scale for maximum ease of reading and use.

Another factor to be considered when utilizing a hair element in connection with a humidity indicator is the fact that the total motion produced is a function of the length of the hair element; that is to say, the longer the hair element, the greater expansion or motion available for conversion into an output indication. Furthermore, the greater the total extension available, the less magnification required for conversion into an output indication. This contributes to greater accuracy in that inaccuracies inherent in the hair element are magnified by any motion magnifying linkage system used, and if the motion magnification is kept to a minimum, resulting errors will be kept to a minimum. For this reason, it is desirable to utilize the greatest length of hair so that the extension of the hair element is at a maximum. By using the greatest possible hair length, a larger scale may be used without necessity of resorting to complicated motion magnifying linkage systems.

With the above in mind, it becomes a problem to properly utilize the maximum length hair element in a compact instrument having dimensions on the order of 4″ x 5½″ x 1⅝″. Some means must be provided to suitably arrange a maximum length of hair within the compact housing so that the benefits resulting from the maximum length hair can be obtained.

In all humidity responsive devices utilizing human hair, the problem of calibration is extremely important, in that individual hairs will vary as to their characteristics. Further, if low manufacturing cost is to be achieved, dimensional tolerances must be rather loose and this adds to the calibration problem. Therefore, some means must be provided to easily and accurately calibrate the device upon the completion of the assembly thereof.

Accordingly, it is an object of the present invention to provide a novel humidity indicator utilizing human hair as the hygroscopic element, wherein a maximum length of human hair is used, simple and effective means are provided to convert the non-linear motion of the hair elements into linear motion of an indicating arm, simple and accurate means are provided to calibrate the instrument, and the entire combination is confined in a small, compact housing.

The invention comprises an elongated hair element looped around a roller affixed to one side of the instrument housing so that the extremities of the hair element extend to the opposite side of the instrument housing; thus, permitting the use of a hair element having a length substantially twice the overall length of the instrument. One end of the hair element is affixed to a rather stiff flexible member which operates as a combined support and overload strain relief. The flexible member is relatively adjustable so that a zero-setting of the instrument can be accomplished. The other end of the hair element is adjustably secured to one end of a pivoted bell crank, to the other end of which is adjustably secured a non-hygroscopic filament. The filament extends from the crank, passes over a cam surface and is affixed thereto. The cam surface is pivotally mounted, and there is affixed thereto an indicator arm. A suitable spring is provided to maintain the system in tension. The cam surface has a configuration which converts the non-linear extension of the hair element into a linear motion of its associated indicator arm. The adjustable connection between the hair element and the crank is a so-called ranging adjustment to compensate for variations in hair extension, and the filament is adjustably connected to the crank, so that individual variations in filament length can be corrected, from unit to unit.

A detailed description now follows, which, when taken in conjunction with the drawings annexed hereto, will suitably outline the mode of construction, operation, and method of calibration of the novel instrument disclosed herein.

In the drawings:

Fig. 2 is a bottom view of the instrument with the bottom portion of the housing removed.

Fig. 3 is an end view of the instrument with the end portion of the housing cut away.

Fig. 6 is an exploded view of the crank shown in Fig. 1.

Figs. 7 and 8 are other views of the crank shown in Fig. 6.

Figure 1:
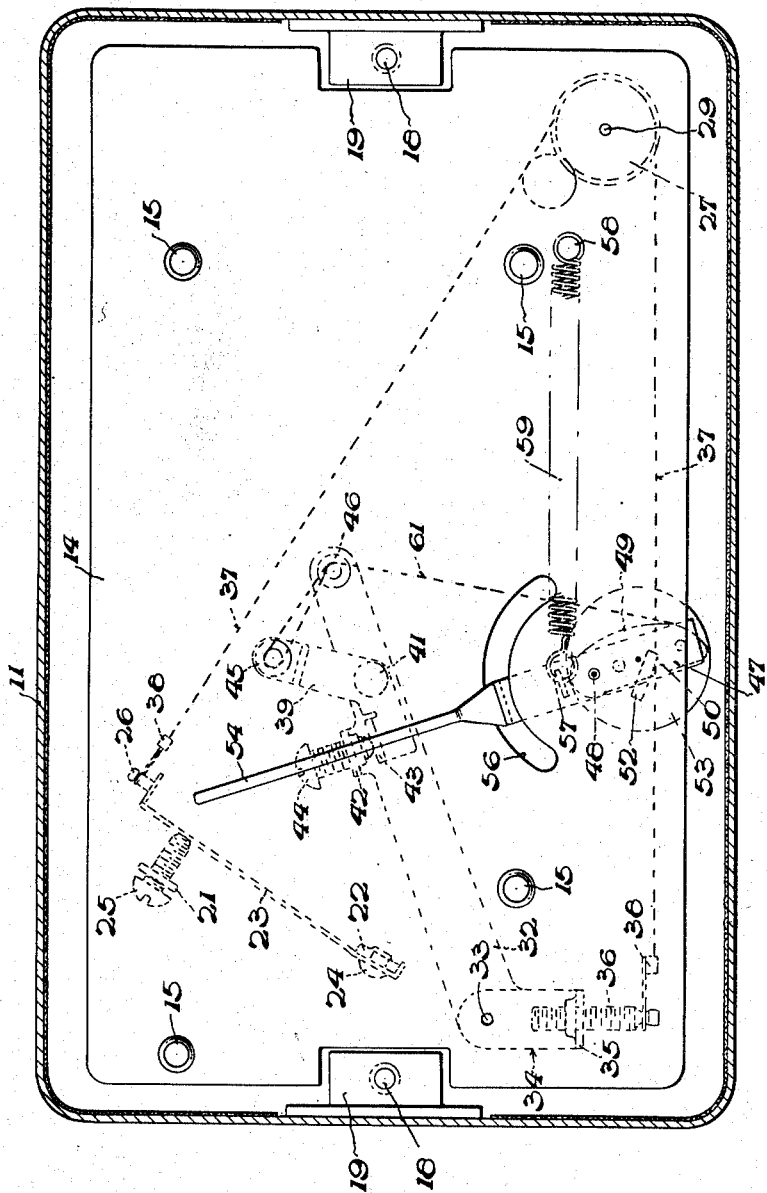
Fig. 1 is a front view of the instrument with the front portion of the housing cut away.

Referring first to Figs. 2 and 3, it is seen that the instrument comprises a housing 11 having a detachable back plate 12 to which may be secured a supporting panel 13. The panel 13 carries the associated condition responsive elements, linkage system, and indicator arm in cooperation with front panel 14. The two panels 13 and 14 may be suitably secured together in spaced relationship by means of spacer members 15 and cooperating bolts 16. Both extremities of each spacer member 15 are of a reduced diameter to afford shoulders abutting against the inner opposite faces of panels 13, 14, and neck portions extending into cooperating apertures located in the panels 13, 14. The neck portions cooperating with panel 14 extend beyond the panel and have their peripheral edges rolled over to provide a tight clamping action. The neck portions cooperating with panel 13 do not extend beyond the panel, but they have threaded bores to cooperates with threaded bolts 16. One pair of the bolts 16 abut the rear face of panel 13, whereas the other pair are elongated so as to permit the bolts to abut the rear face of plate 12. A pair of suitable auxiliary spacer members 17 are provided between the plate 12 and panel 13 through which the elongated pair of bolts 16 extend. Thus, the spacers 15 and 17 and bolts 16 serve to clamp the panels together and to the back plate, and maintain same in properly spaced relationship.

The back plate 12 is secured to the housing 11 by means of a pair of screws 18, which pass through apertures in the plate 12 and cooperate with threaded apertures in the brackets 19 rigidly fastened to the housing 11.

The panel 13 has a pair of supporting brackets 21, 22, extending substantially at right angles from its inner surface and these bracket members 21, 22, may be formed by cutting away sections of the panel 13 and bending same upwardly to form an approximate right angle. The relatively stiff flexible member 23 has one end hooked around the bracket 22 and is rigidly secured thereto by means of rivet 24. The other end of member 23 extends beyond the bracket 21 and has its outer extremity bent in the form of a right angle. The bracket 21 has a threaded aperture for receiving therein the adjusting screw 25. The flexible member 23 is made with an initial counter-clockwise bias so that it tends to rest against the projecting end of the adjusting screw 25. The screw 25 may be moved with respect to the bracket 21 and this will permit the flexible member 23 to shift its position.

Extending from the turned-over end of flexible member 23 is a small supporting bracket 26. This bracket may be formed by cutting away a section of the flexible member 23 and bending it upwardly at an approximate right angle. The supporting bracket 26 affords a relatively fixed support for one end of a hygroscopic element.

A pulley 27 in the form of a cylindrical roller is suitably journaled for rotation between the panels 13, 14. The pulley 27 has an axial bore 28 through which passes a pin shaft 29. The pin shaft 29 extends through a pair of dimpled apertures in the panels 13, 14, and the end of the pin shaft is flattened so that the shaft is retained in place. The inner extremities of the dimpled apertures abut against opposite ends of the pulley 27 to maintain the pulley properly spaced from each panel. The pulley 27 has a series of parallel grooves 31 surrounding its periphery.

Also journaled for rotation between the panels 13, 14, is a bell crank 32, the journaling arrangement being identical to that described for the pulley 27, there being a pin shaft 33 passing through the bell crank 32, about which same pivots. Figs. 6, 7, 8 show the detailed configuration of the bell crank 32 and it is to be noted that the bottom section of the bell crank is in the form of a U-bracket 34. The pin shaft 33 extends through opposite legs of the U-bracket 34. A threaded aperture is provided in the connecting link 35 of the U-bracket 34 and receives therein an adjustable screw 36. The screw 36 provides a relatively movable support for one end of a hygroscopic element.

The hygroscopic element 37 is in the form of a conventional banjo assembly of parallel spaced elongated human hairs having their ends clamped together by means of suitable clamps 38, the clamps 38 being adapted to engage the bracket support 26 and the adjustable screw 36. The hygroscopic element 37 passes over the pulley 27 and the individual hair elements rest in the grooves 31 provided in the periphery of pulley 27.

Turning now to the configuration of the bell crank 32 we see that the upper end of the bell crank has affixed thereto, near its extremity, the auxiliary crank 39. The auxiliary crank is pivoted with respect to bell crank 32 by means of pivot arrangements 41. The bell crank 32 and auxiliary crank 39 have cooperating sections 42, 43, extending approximately at right angles to their surfaces. The section 42 has a threaded aperture for receiving therein the adjusting screw 44. The end of the adjusting screw 44 rests against the section 43. Rigidly secured as by way of a rivet to the upper end of auxiliary crank 39 is a pulley 45. Affixed to the upper extremity of bell crank 32 there is a similar pulley 46 suitably riveted thereto.

Figure 4:
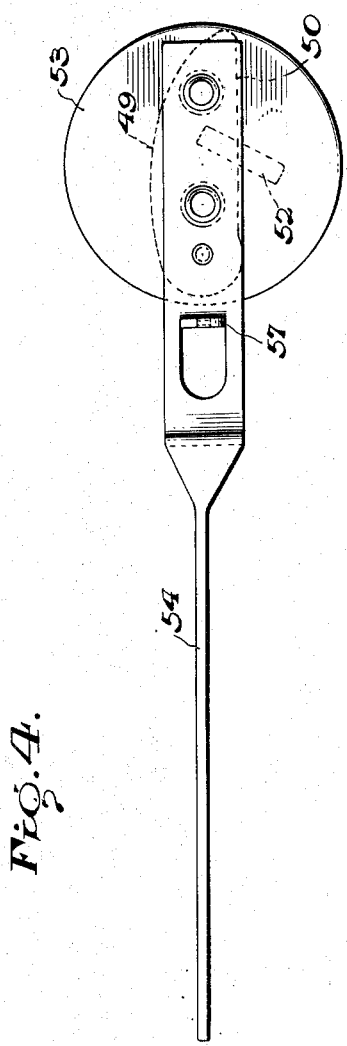
Fig. 4 is an exploded view showing the manner in which the cam and its associated indicator arm are assembled.
Figure 5:
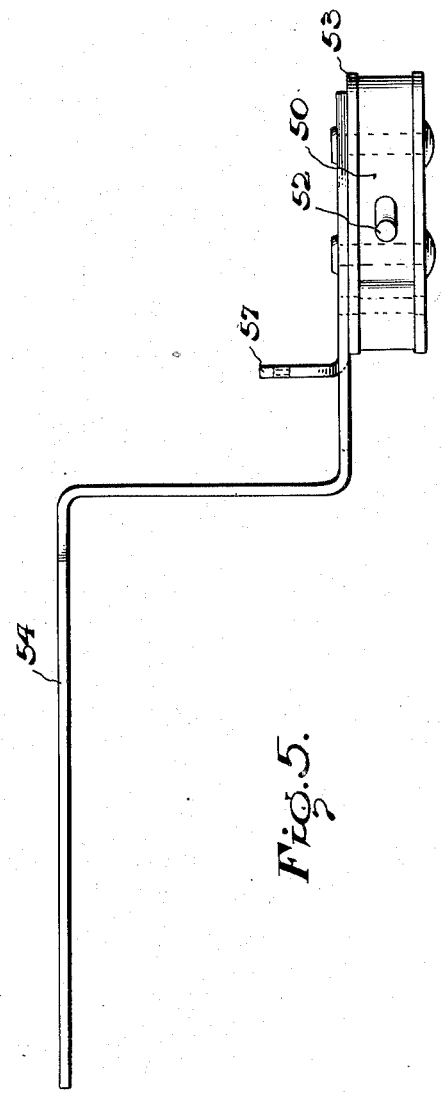
Fig. 5 is a side view of the view shown in Fig. 4.

Situated below the upper extremity of the bell crank 32 there is a cam 47 journaled for rotation between the panels 13 and 14 by means of a pin shaft 48 of the type heretofore described in connection with the journaling arrangements of the bell crank 32 and pulley 27. Figs. 4 and 5 should be referred to in connection with the following description. The cam 47 has an active cam surface 49 and an inactive substantially flat surface 50 to which is secured a pin 52. The cam 47 is confined between a pair of cylindrical plates 53 which may be suitably secured to the cam by means of rivets. Also rigidly affixed to the cam 47 is an indicator arm 54 having its respective ends offset from one another and having one end rigidly secured to one of the plates 53 by means of rivets or the like. A spacer member 55 surrounds the pin shaft 48 and extends between the panel 14 and one face of the indicator arm 54. This spacer serves to maintain the cam 47 and its associated structure properly spaced between the panels 13 and 14. The extremity of the arm 54 away from the cam 47 extends through an arcuate slot 56 provided in the panel 14. This extremity is adapted to cooperate with a scale (not shown) which may be suitably arranged on the panel 14. A small supporting bracket 57 is stamped out of the arm 54 and cooperates with a small bracket 58 stamped out of panel 13 to provide supports for a relatively weak coil spring 59.

A non-hygroscopic filament 61, which may be glass fibre or the like, is looped around the pulley 45, passes over the pulley 46, over the active cam surface 49, and has its ends looped around the pin 52 and is secured thereto.

With the above relationship of the component parts in mind, it is apparent that any expansion or contraction of the hygroscopic element 37 will cause the bell crank 32 to rotate about its pin shaft 33. This will cause the upper extremity of the bell crank to rotate about the pin shaft 33 and this rotation will be transmitted to the cam 47 by means of the filament 61. Any rotation of cam 47 will cause the arm 54 to correspondingly rotate. Thus we see that the arm 54 will move to give an output indication corresponding to changes in length of the hygroscopic element 37.

It is to be noted that the configuration of the active cam surface 49, is such as to vary the effective lever-arm developed by the filament 61 acting upon the cam 47. In the range of extremely low humidities, where the arm 54 is in its extreme left position (see Fig. 1), it is to be noted that the effective lever-arm developed by filament 61 is at a maximum. As the arm 54 swings to the right, the effective lever-arm asserted by filament 61 is gradually reduced to a minimum. Thus, for equal movement of arm 54, a greater motion or extension of the hygroscopic element 37 is required in the region of low humidity than is required in the region of high humidity. This corresponds to the characteristic of the hygroscopic element 37 in that its greatest relative change of length takes place in the relatively low humidity region and gradually diminishes as saturation is reached. The effect of the above is to produce a linear motion of the arm 54 with changes of humidity. That is to say, equal changes of relative humidity will produce correspondingly equal changes of motion of the arm 54. This arrangement permits the use of a linear scale to cooperate with the arm 54 to give a visual indication of the magnitude of humidity under observation.

The adjusting screws 25, 36, and 44, are provided to calibrate the instrument after assembly, and the manner of calibration will now be described. Ordinarily, in the assembly of the instrument, the adjusting screws 25, 36, and 44 are positioned so that the threaded apertures cooperating with same bisect their threaded portions. With such an arrangement, if all of the parts making up the assembly are fabricated to precise specifications, very little calibration or adjustment will be necessary. However, as is usual in normal manufacturing operations, the parts will vary within specified tolerances and individual calibration of each instrument will be necessary to compensate for the minute changes or variations from unit to unit.

The instrument has been designed so that for 50 percent total extension of the hygroscopic element 37, the edges of the vertical legs of the U-bracket 34 will be substantially parallel to the vertical edges of the panel 13. Knowing this relationship, the first step in calibrating the completed instrument is to artificially position the bell crank 32 in such a manner as to achieve the aforesaid parallel relationship. This will correspond, as said before, to fifty percent extension of the hair element 37. Such an extension corresponds to approximately 35 percent relative humidity. Therefore, with the bell crank held in a fifty percent extension position, the adjusting screw 44 is manipulated until the indicator arm reads thirty-five percent relative humidity. This initial adjustment matches the linearizing effect of the cam to the hair element and has the effect of adjusting the individual instruments for any variations from unit to unit in the length of the filament 61.

The instrument is next placed in an atmosphere of fifty percent relative humidity and allowed to stabilize for a sufficient period of time. The adjusting screw 25 is then manipulated until the indicator arm 54 reads fifty percent relative humidity. The adjustment of screw 25 has the effect of shifting the scale of the instrument and, for this reason, is conventionally known as a zero-setting adjustment. Adjustment of screw 25 normally compensates for variations in length between individual hair element assemblies; that is to say, variations in length from unit to unit in the hygroscopic element 37.

The instrument is next placed in an atmosphere of thirty percent relative humidity and allowed to stabilize for a sufficient length of time. The exact indication of the arm 54 is then noted. The instrument is then placed in an atmosphere of seventy percent relative humidity and the exact indication of the arm 54 is noted. If the range in humidity indicated by a reading of the instrument is greater than or less than the actual range, the screw 36 is manipulated to change the magnification of the linkage system. This is effected by changing the position of the hygroscopic element 37 with respect to the pin shaft 33. That is to say, the lever arm, defined by the connection of the hygroscopic element 37 to screw 36 and the fulcrum of the bell crank 32, is varied. Such an adjustment of the screw 36 is called a ranging adjustment and normally compensates for variations in elongation between different hair element assemblies; that is, differences from unit to unit in elongation of the hygroscopic element 37. In this last step in the calibration procedure, if the indicated difference in humidity equals the actual difference but the scale readings do not coincide with actual, the screw 44 is manipulated to move the indicator arm 54 to its correct position.

After the calibration has been completed, the instrument is ready for use, and should function accurately without need for further adjustment under normal conditions.

It is to be noted that the total length of the hygroscopic element 37 is substantially twice the maximum length of the instrument itself. This is achieved by the use of the pulley 27 and results in relatively large total motion from the condition responsive element, thus reducing the magnification required by the linkage system coupling the hygroscopic element to the indicator arm.

Nearly all the parts making up the assembly can be fabricated by simple sheet-metal operations and can be fabricated to rather loose dimensional tolerances. The novel arrangement of the three calibrating screws 25, 36 and 44 permits any loose tolerances to be compensated for after assembly to produce an instrument that is capable of giving accurate indications over a sustained period of operation. The expected accuracy from the instrument is approximately a plus or minus five percent. All of the parts required for adjustment and calibration are readily accessible and easy to manipulate, and the calibration procedure is simplified by the novel invention.

The parts are assembled within the available space in an efficient manner whereby a compact and rugged assembly is achieved. It is also to be noted that the provision of assembling the panels 13, 14 to the back plate 12 permits the entire assembly to be easily removed from the housing for inspection and adjustment as required.

A series of openings 62 are provided in the sides and bottom of the housing 11 to permit ample flow of air over the hygroscopic element 37. These openings are covered by suitable screening 63 to prevent dust, dirt, and insects from entering the interior of the housing. A window arrangement 64 is also provided in the front face of the housing 11 to permit ready inspection of the indicating arm and cooperating scale.

What is claimed and desired to be secured by United States Letters Patent is:

1. In a humidity indicator, in combination: A pair of substantially flat rectangular juxtaposed supporting plates rigidly held together in spaced relationship, a relatively stiff flexible member extending upwardly between said plates whereby its upper extremity is positioned near one of the upper corners of said plates, means for securing the lower extremity of said flexible member to one of said plates, a first screw adjustably mounted on one of said plates cooperating with said flexible member to change the position of the upper extremity thereof, an elongated hygroscopic element extending between said plates, said hygroscopic element changing in length in response to changes in humidity and having a non-linear characteristic whereby equal changes in humidity result in unequal changes in length, a pulley mounted for rotation between said plates near one of the lower corners thereof and diametrically disposed to said upper extremity of said flexible member, a first bell crank pivotally mounted between said plates and having its lower leg extending downwardly towards the other lower corner of said plates and its upper leg extending towards the opposite upper corner of said plates, a second screw carried by the said lower leg and adjustable to vary the effective lever arm of said lower leg, said hygroscopic element being looped around said pulley and having one end secured to the upper extremity of said flexible member and the other end secured to said second screw, a second bell crank pivotally mounted on the upper leg of said first bell crank, a third screw carried by said upper leg of said first bell crank cooperating with said second bell crank to move its free end with respect to said first crank, a cam pivotally mounted between said plates and having an indicator arm integral therewith, a non-hygroscopic glass-fiber filament having one end connected to the free end of said second bell crank and the other end wrapped around the active surface of said cam and connected thereto, and spring means connected to said indicator arm to maintain the entire assembly under tension, the configuration of said active cam surface being such that said indicator arm has equal movements for equal changes in humidity.

2. The combination defined in claim 1 wherein said lower leg of said first bell crank is parallel to the vertical edge of said plates at substantially fifty per-cent relative humidity.

3. The combination defined by claim 2 wherein one of said plates has an arcuate slot, said indicator arm has an offset portion extending through said slot, and a linear scale is provided on said plate to cooperate therewith.

4. The combination defined in claim 3 wherein a housing is provided for said plates and their associated parts, there being a window in said housing cooperating with said scale, said plates being removably connected to one side of said housing.

WALTER E. WINDSOR.
ANDREW J. KOLL.

References Cited in the file of this patent

UNITED STATES PATENTS

| Number | Name | Date |
|---|---|---|
| 2,034,884 | Sharp | Mar. 24, 1936 |

FOREIGN PATENTS

| Number | Country | Date |
|---|---|---|
| 218,145 | Germany | Mar. 24, 1907 |
| 228,228 | Germany | June 17, 1909 |